April 9, 1957 — M. R. DOCK — 2,788,044
SELF-LOCKING NUT AND THREADED MALE MEMBER ASSEMBLY, AND PARTS THEREOF
Filed May 11, 1954 — 2 Sheets-Sheet 1
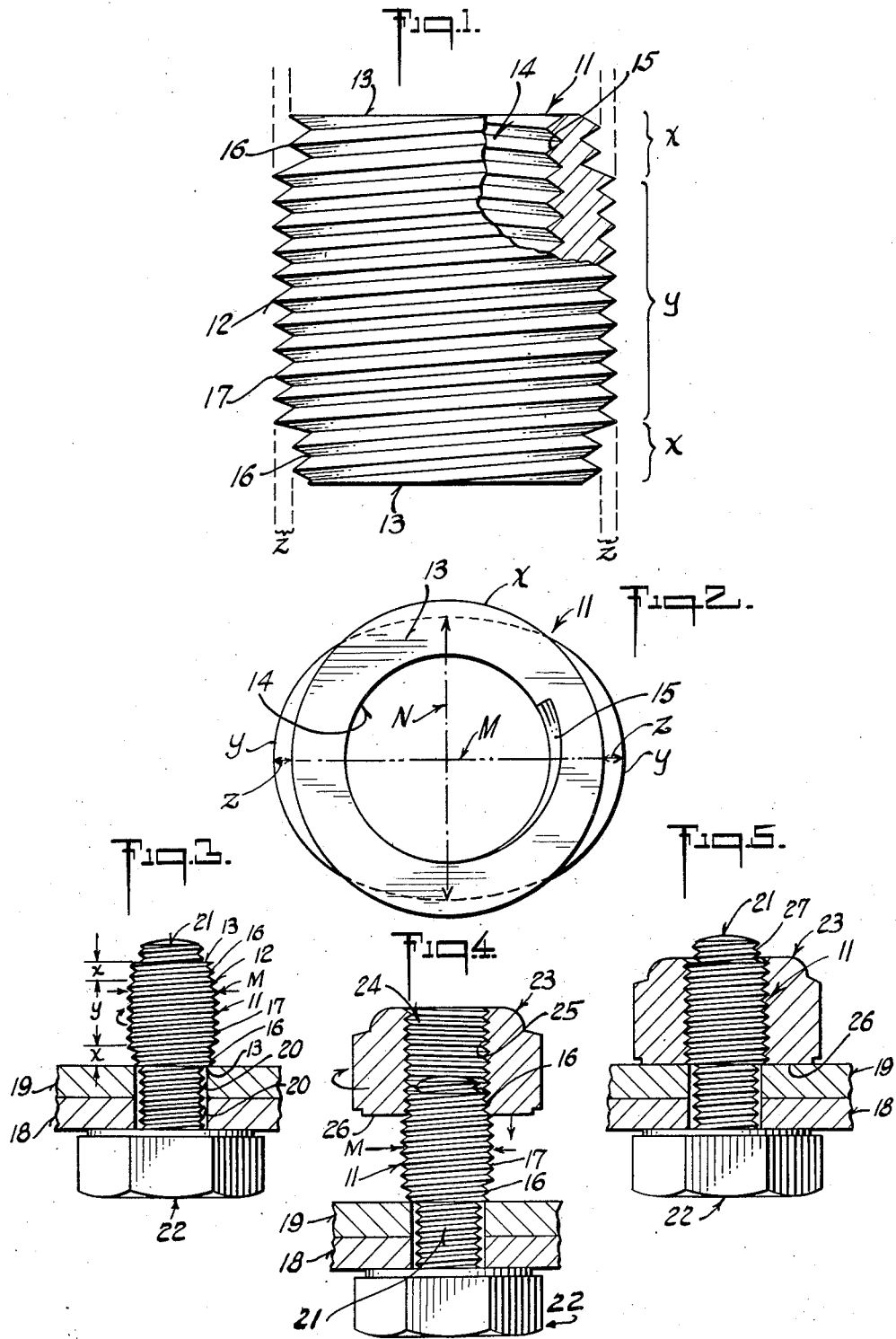

April 9, 1957
M. R. DOCK
2,788,044
SELF-LOCKING NUT AND THREADED MALE MEMBER
ASSEMBLY, AND PARTS THEREOF
Filed May 11, 1954
2 Sheets-Sheet 2
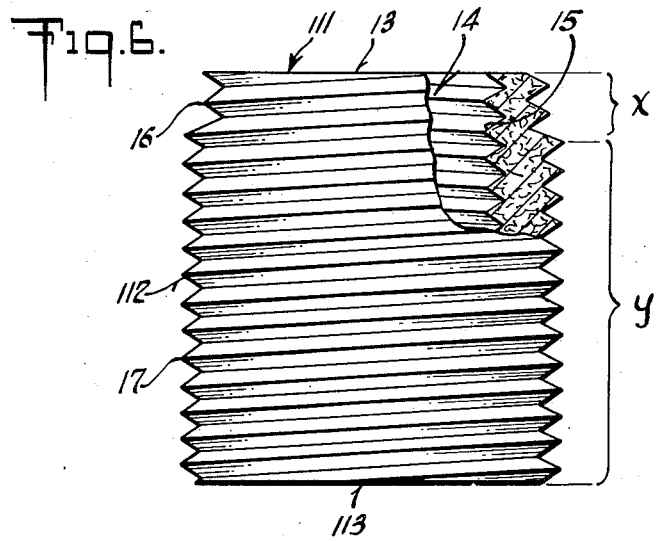
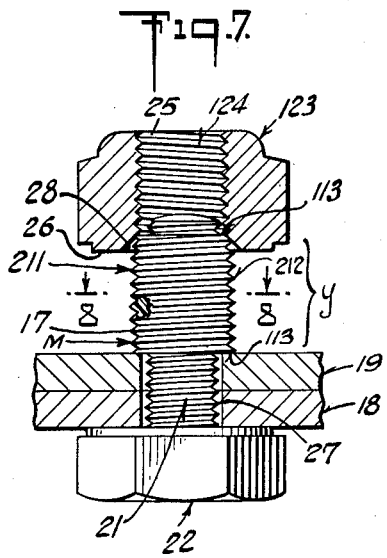
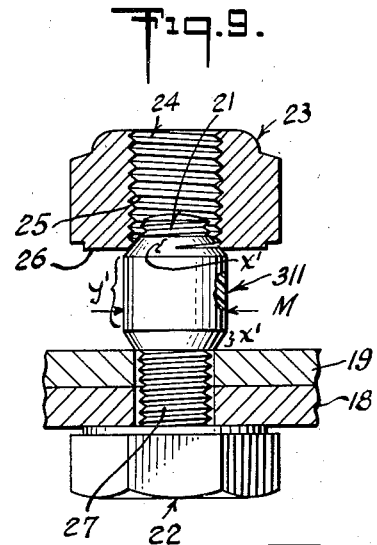
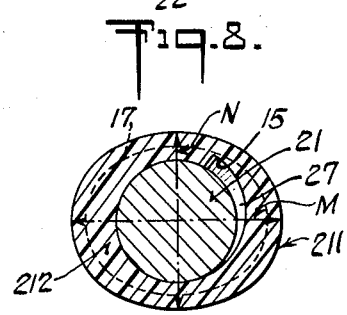
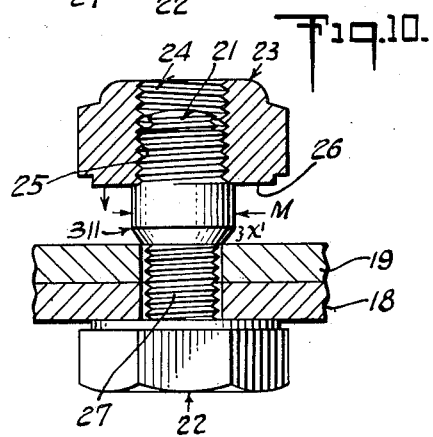

United States Patent Office 2,788,044
Patented Apr. 9, 1957

2,788,044

SELF-LOCKING NUT AND THREADED MALE MEMBER ASSEMBLY, AND PARTS THEREOF

Mortimer Russell Dock, New York, N. Y.

Application May 11, 1954, Serial No. 428,955

20 Claims. (Cl. 151—21)

The present invention relates to self-locking nut and threaded male member or bolt assemblies, and parts thereof; and, more particularly, to insert means effecting releasable lock of a threaded nut upon such a threaded male member.

A general object of the present invention is to provide such an assembly featured by a distortable sleeve means interposed between an internally-threaded nut and an externally-threaded male member or bolt shank which is readily produced on a mass production basis, permits ready and simple assembly of parts with attainment of secure and efficient locking of the nut on the bolt means while permitting ready intentional disassembly of the parts.

A more specific object of the invention is to provide in such an assembly a locking sleeve means which permits simple conversion of standard nuts to lock nuts for use on threaded shanks of standard bolts without requiring any reconstruction or revision of the nut and bolt.

A further object of the present invention is to provide such locking sleeve means which may be readily threaded upon a standard threaded bolt shank efficiently permitting threadably-forced locking thereon of an oversized standard threaded nut while allowing ready threadable removal of the sleeve from the bolt shank upon threadable removal of the nut from the sleeve.

Another object of the invention is the provision of such locking sleeve means which may be stocked in standard sizes permitting one to convert in a simple manner standard nuts into effective locknuts relative to standard smaller bolts without requiring change or alteration of the nuts and bolts.

A still further object of the invention is to provide structural embodiments of the device and the sleeve unit thereof which may be easily and economically constructed and allow efficient use and operation.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

Fig. 1 is an enlarged side elevational view, with parts broken away and in section, of an embodiment of a locking sleeve of the present invention;

Fig. 2 is an enlarged end view of the locking sleeve shown in Fig. 1;

Fig. 3 is a side elevational view of a threaded bolt shown extending through aligned holes in illustrative work pieces or plate members to be clamped together thereby and with the latter shown in section, the threaded bolt shank extending beyond the plate members being shown equipped with the embodiment of the locking sleeve illustrated in Figs. 1 and 2;

Fig. 4 is an elevational view with parts in section similar to Fig. 3 but illustrating the threadable mount of a standard nut upon the locking sleeve after the latter had been mounted in the manner illustrated in Fig. 3, the nut being illustrated in axial section;

Fig. 5 is a view similar to Fig. 4, showing the relative positions of the bolt, locking sleeve and nut after the latter has been fully turned down upon the sleeve to abutment of the proximal plate member;

Fig. 6 is an enlarged elevational view, with parts broken away and in section, similar to Fig. 1, of another embodiment of the locking sleeve of the present invention;

Fig. 7 is a view similar to Fig. 4, illustrating use of a still further embodiment of the locking sleeve of the present invention;

Fig. 8 is an enlarged cross-sectional view, taken substantially on line 8—8 of Fig. 7;

Fig. 9 is a view similar to Figs. 4 and 7 of an additional embodiment of the locking sleeve of the present invention; and Fig. 10 is a view similar to Fig. 9 of the parts illustrated therein, showing the nut turned down about halfway on the locking sleeve of that embodiment.

Prior to the present invention, various types of locknuts have been designed which are characterized by certain unique nut structure and locking inserts, as contrasted with standard nuts. Such unique nut structures entail more costly and complicated manufacturing procedures than do the fabrication of standard nuts. The present invention provides locking sleeve means which may be fabricated in an economical and simple manner as a separate and distinct unit from threaded male members or bolts and nuts which may be employed in a simple manner therewith to effect efficient locking, certain embodiments permitting, if desired, ready separation or demountation of the parts of such an assembly, including the nut, the locking sleeve, and the bolt.

Referring to the drawings, in which like numerals identify similar parts throughout, it will be seen from Figs. 1 to 5 incl. that an embodiment of the present invention may include a locking sleeve 11 consisting of an elongated tubular body 12, having similar opposite ends 13, 13, and a cylindrical bore 14, provided with an internal helical female thread 15, preferably of standard pitch and configuration to be readily run down over and mated with a male helical thread of standard type of a threaded male member or bolt shank. Locking sleeve 11 is fabricated from distortable material, preferably resilient or elastic, such as, for example, resilient steel or other resilient metallic material having high tensile strength and load-carrying capacity.

At least a mid-portion or longitudinal section Y of the locking sleeve body 12 is externally non-circular in transverse section, preferably being elliptical, as is best seen in Fig. 2. Each end of the sleeve body 12 is provided with an end section X which externally is substantially circular in transverse section and is preferably provided with an external helical male thread 16, preferably of standard pitch and configuration to be readily mateable with a standard female thread of a nut. The elliptical section Y is also provided with an external helical male thread 17 which is merged with the circular end threads 16, 16 to form continuations thereof. As will be seen from Figs. 1 and 2, the major axis M of the elliptical cross-section of the non-circular mid-portion Y exceeds the external diameter of the end portions X, X by 2Z, which for clarity, has been illustrated in exaggerated dimension but which may be a very small fraction of an inch; for example, about 0.015" to 0.02", for a standard nut having an internally threaded bore of about one inch in diameter, the threads of which normally have a clearance of about 0.005" with the male threads of the standard bolt on which it is intended to be mounted in the absence of the intervening locking sleeve of the present invention. Preferably, the minor axis N of the elliptical section will be substantially equal to the diameter of end portion X minus 2Z so that if the elliptical section is distorted from ellipticity to circularity, its external male thread 17 will be of the same diameter as the external male thread 16 of either end section X.

In assembling the parts of a self-locking nut and threaded male member assembly of the present invention with the employment of a bolt having a standard threaded shank, a standard internally threaded nut, and the locking sleeve of Figs. 1 and 2, one may, as proposed in Fig. 3, clamp together thereby a pair of structural elements or work elements illustrated, for example, in the form of a distal plate 18 and a proximal plate 19, having aligned holes 20, 20 through which the externally threaded shank 21 of a standard bolt 22 is inserted. The extending end of the externally threaded bolt shank 21 threadedly receives locking sleeve 11, which may be readily turned down thereon by one's fingers, since its female thread 15 is circular, and mated therewith, similar to the mating of a standard female thread in a nut provided for mounting upon the bolt shank 21 in the usual manner. The locking sleeve 11 is threadably turned down about the bolt shank 21 until its distal end 13 is brought to abutment of the proximal plate 19, as illustrated in Fig. 3.

The assembly is then completed by selection of a standard nut 23 which has a cylindrical bore 24 provided with an internal helical female thread 25, preferably also of standard pitch and configuration, and readily mateable with the thread 16 of either end section X of the locking sleeve 11. Each circular thread 16 extends at least a fraction of one full turn so as to allow ready starting of the nut 23 upon the proximal end of the locking sleeve after it has been mounted, as illustrated in Fig. 3, upon the bolt shank 21. Preferably each circular thread 16 extends from one to two full turns so as to assure effective starting of the nut, as illustrated in Fig. 4. The standard nut 23 is then forcibly rotated or turned down over the elliptical mid-portion Y of the locking sleeve 11 to the position illustrated in Fig. 5, with abutment of the bottom end 26 of the nut against the proximal plate 19 for secure clamping of the plates together by the bolt 22 and nut 23. The intervening locking sleeve 11 effectively locks the nut to the bolt shank 21. In forcing the nut 23 down over the non-circular elliptical section Y of the locking sleeve 11, it is caused to be distorted from ellipticity towards circularity.

As a result, the circular thread 15 internally of the elliptical section Y is distorted from circularity towards ellipticity, effectively to grip and frictionally lock against the circular male thread 27 of the bolt shank 21. Also, there is secure frictional lock between the distorted elliptical thread 17 and the circular nut thread 25, since the resilient material, from which the locking sleeve 11 is formed, tends to resist the deformation towards circularity and this distortion or deformation is within the elastic limits of the sleeve material. Consequently, a radial force is applied by the nut to the threaded male member or bolt shank through the intervening locking sleeve, the radial force being creative of sufficient friction effectively to resist tendency of forces of vibration, which may be normally encountered, to loosen a nut upon a bolt shank.

It will thus be seen that the embodiment of the locking sleeve illustrated in Figs. 1 to 5 inclusive permits secure locking to a standard bolt of one size of a standard over-sized nut with effective frictional grip between the two sets of mating threads, i. e., the male thread of the bolt shank and the circular internal female thread of the sleeve and the external male thread of the sleeve and the internal circular female thread of the nut. Also, no change or alteration in the structure of the standard bolt and nut is required and they may be stocked as usual in standard sizes with additional stocking of locking sleeves of the present invention, classified with respect to the particular size and type of bolts on which they may be readily threaded and the particular size and type of standard nuts which may be threaded thereon for completion of the locking assemblies.

Preferably, opposite ends 13, 13 of the locking sleeve 11 are both provided with the starting sections X, X so that it will not be necessary for one to orient the locking sleeve in any particular manner with respect to the bolt shank and the work through which it is mounted. However, it is to be understood that the present invention may be practiced by providing such a locking sleeve with only one starting end so long as the user employs care in mounting the sleeve upon the threaded male member or bolt shank to assure that the single starting end X is trailing. As illustrated in Fig. 6, such a locking sleeve 111 may be in the form of a tubular body 112 having a leading end 113 and a trailing end 13, with the latter provided in the form of a starting section X carrying the circular helical male thread 16. The sleeve body 112 is provided with the cylindrical bore 14 carrying the internal circular female helical thread 15 mateable with the external helical male thread of a threaded male member or shank of a standard bolt. The main section Y of the locking sleeve 111, intervening the leading end 113 and the nut-starting section X, is similar in configuration to the mid-section Y of the locking sleeve embodiment of Figs. 1 to 5 incl., having an external elliptical thread 17 merged with and continuing from the circular thread 16 of the starting section X. Since practice of the present invention is not limited to the employment of steel, or similar high tensile strength metal, as the material from which locking sleeves of the present invention may be formed, the Fig. 6 structure has been illustrated as being formed of fiber which may have certain elasticity or recovery after the nut is freed therefrom. For heavy duty service, steel may be preferred, since it has good load-carrying capacity, permitting the application of large clamping forces without stress rupturably straining the threads. For lighter services, suitable fibrous material, such as that frequently used for inserts in locknuts of other types well known in the art, may be employed from which to construct locking sleeves of the present invention.

As illustrated in Fig. 7, an embodiment of the locking sleeve of the present invention may be in the form of a tubular body 212 which is elliptical in transverse section from end to end thereof. In other words, the entire length of the locking sleeve 211 may be in the form of a non-circular or elliptical section Y, which extends from leading end 113 to trailing end 113 and such locking sleeve may, if desired, be formed of suitable elastic plastic, such as nylon. When such a locking sleeve, as illustrated in Fig. 7 is employed, with no starting end sections being provided, a nut 123 should be used therewith which has its internally threaded bore 124 provided, at the leading face or end 26 of the nut, with a flared throat 28 or tapered mouth readily receivable over either end 113 of the locking sleeve body 212, and with partial threads in the flared throat effecting initial engagement of the elliptical external thread 17 of the locking sleeve 211.

While it is not possible to provide locking sleeves of the present invention devoid of external male threads when formed of hard resilient metal of high tensile strength, such as steel, it is possible to do so when elastic materials are employed, such as fiber or elastic plastic, e. g., nylon. A fiber locking sleeve of the present invention, when devoid of external male threads, will have such, at least in incomplete form, cut thereon when an internally threaded nut is threadably forced down thereover. In the case of elastic plastic material, e. g. nylon, a locking sleeve fabricated therefrom will have such external threads pressed into the external surface of the elliptical section of the sleeve when devoid of such external male threads; and in such case, when the nut is backed off, complete recovery of the elastic plastic is experienced, leaving the relieved elliptical section again free of external male threads.

As illustrated in Fig. 9, such an elastic plastic sleeve 311 may be provided with an internally threaded bore similar to that of the locking sleeves 11, 111 and 211 of Figs. 1, 6 and 7. However, its external surface initially will be free of male threads, as shown. Preferably, such an elastic plastic or nylon sleeve 311 may be provided with tapered end sections X', X' to facilitate starting of the nut 23 thereon with the intervening mid-section Y' being externally elliptical in transverse section, just as in the case of the other embodiments of the locking sleeve previously described but also free of external male threads. In assembling the parts of the Fig. 9 embodiment, the locking sleeve 311 is threadably turned down upon the bolt shank 21. The nut 23 is then started over the trailing tapered end X' until the nut thread 25 begins biting into the plastic material of the locking sleeve so that as it advances it presses into the external surface of the sleeve a mating male thread. As the nut 23 is turned down over the locking sleeve 311 it tends to distort elliptical section Y' from ellipticity towards circularity so that the internal circular female thread of the sleeve frictionally grips the external circular male thread of the bolt shank 21 and simultaneously the nut thread 25 is frictionally gripped to the male thread that it presses into the external surface of the sleeve. The attendant pressing of external male threads into the locking sleeve by threadably turning the nut down thereover with distorting force is illustrated in Fig. 10. When the nut 23 is forcibly rotated in the opposite direction to thread it off of the locking sleeve 311 with relief of the distorting force applied by the nut, the distorted sleeve returns to its original shape by recovery of the elastic material, with disappearance of the male threads which were pressed into the external surface of the sleeve. Thereafter, the cut-free sleeve may be easily turned off of the bolt shank 21 for simple disassembly of parts.

In practice of the present invention the locking sleeve means is to be fabricated from distortable or deformable material but not necessarily from resilient or elastic material. In assemblies where the nut and locking sleeve are to remain permanently on the threaded male member or bolt the sleeve may be formed of inelastic or non-resilient material or composition having a relatively low elastic limit so that the radial force applied thereto by forceful turning down or threading of the nut thereover permanently deforms or gives a permanent set to the distorted sleeve to maintain the locking condition thereof. Also, the non-circularity of the distortable portion or section of the locking sleeve is not limited to ellipticity; for example, the sleeve may be thickened at radial points more than two, such as at every 90° or every 45° of the circumference thereof, with intervening thinning and smoothly merging surfaces so that when distorted to circularity the resulting deformed externally-threaded cylindrical outer surface is approximately of the outer diameter of a cylindrical threaded male member which will be mateably received in the threaded nut bore. There is no real production problem in forming helical threads on the non-circular or elliptical section since the threads may be cut by a die which applies such radial force during the cutting operation as tends to distort the section substantially to circularity, particularly with its bore free of any core element that might tend to resist such deformation. Likewise, the external male threads may be rolled into the outer surfaces of the non-circular or elliptical sections or portions of the locking sleeves by suitable dieing wheels in accordance with known techniques.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A self-locking nut and threaded male member assembly comprising, in combination, a relatively non-distortable nut body having an internally-threaded cylindrical bore, a relatively non-distortable externally-threaded cylindrical male member of an outer diameter appreciably less than the inner diameter of said bore for reception of a sleeve therebetween, and an uninterrupted sleeve of distortable material in said nut bore having a bore in which said male member is received, said sleeve being clamped between said male member and nut body with threaded engagement of both said male member and nut body, said sleeve initially having its bore cylindrical for ready threaded reception of said male member and at least a longitudinal portion of its exterior surface non-circular in transverse section and appreciably thicker in at least one radial plane than in others of said non-circular portion, whereby when said nut body is forcibly threaded down upon the latter it distorts the non-circular portion transversely to cause its non-circular exterior to approach circularity and distortably to cause the cylindrical bore of the non-circular portion to be changed slightly to a non-circular shape in transverse section to apply radial locking frictional force to the male member threads.

2. The self-locking assembly as defined in claim 1 characterized by said sleeve bore as well as said nut bore and said male member being provided with precut helical threads with those of said sleeve bore and said male member being relatively closely mating without undue frictional engagement whereby said sleeve may be easily threaded down alone upon said male member.

3. The self-locking assembly as defined in claim 2 characterized by said sleeve being fabricated from distortable resilient material whereby when said nut body is freed from said sleeve the bore of the latter will assume circularity to be freely unthreaded from said male member.

4. The self-locking assembly as defined in claim 1 characterized by said sleeve having adjacent said non-circular portion at least one generally cylindrical end portion thereof of external circular shape readily receivable in said nut bore to facilitate initial threaded engagement of said nut body on said sleeve.

5. The self-locking assembly as defined in claim 4 characterized by said sleeve having both end portions thereof of such external circular shape each readily receivable in said nut bore with said non-circular portion intervening said circular end portions.

6. The self-locking assembly as defined in claim 5 characterized by said sleeve being fabricated from distortable resilient material.

7. The self-locking assembly as defined in claim 6 characterized by said resilient sleeve being fabricated from nonmetallic elastic material.

8. The self-locking assembly as defined in claim 7 characterized by said elastic sleeve having its external surface unthreaded, said internally-threaded nut body being adapted to deform the sleeve material both to reduce the non-circularity of its intervening portion and to define in the exterior of the latter helical threads mating with the nut threads.

9. The self-locking assembly as defined in claim 6 characterized by said resilient sleeve having its bore and its exterior surface provided with precut helical threads with those in said sleeve bore being relatively closely mated with the helical threads of said male member but free running with respect thereto when said nut body is not mounted on said sleeve whereby said nut-free sleeve may be easily threaded onto and off of said male member, the external threads of said non-circular sleeve portion being relatively closely mateable with the helical threads in said nut bore when the non-circular shape of said portion is distorted substantially to circularity, said circular end portions each having at least an appreciable portion of at least one turn of a circular helical thread mateable with and free-running with respect to the nut threads.

10. A self-locking nut and threaded male member assembly comprising, in combination; a relatively non-distortable, metallic, standard nut having a cylindrical bore provided with female helical threads; a relatively non-distortable, metallic, externally-threaded, standard cylindrical male member spaced laterally inward an appreciable distance from said bore threads; and an intervening, uninterrupted, elongated sleeve of resilient material threadably engaged in said nut bore and upon said male member, said sleeve having a normally cylindrical bore provided with female helical threads which are substantially circular when said nut is not carried by said sleeve and which mate and have free-running engagement with the male member threads when said sleeve is nut-free, at least the major longitudinal portion of the exterior of said resilient sleeve initially being slightly elliptical in transverse section and appreciably thicker in at least one radial plane than in others of said elliptical portion, said elliptical portion being distorted toward circularity by forcible threading of said nut down thereon causing said circular female sleeve threads to be distorted to a degree of ellipticity which applies radial locking frictional force to the circular male member threads.

11. The self-locking assembly as defined in claim 10 characterized by the provision of said sleeve adjacent its elliptical portion with a generally cylindrical end portion which is readily receivable in said internally-threaded nut bore to facilitate start of the threading of said nut onto said elliptical portion.

12. The self-locking assembly as defined in claim 11 characterized by the exterior of said end portion being substantially circular in transverse section and having a portion of a circular male thread mateable and free-running with the nut bore threads.

13. The self-locking assembly as defined in claim 12 characterized by the provision of said sleeve with such an externally-threaded end portion at each end thereof.

14. The self-locking assembly as defined in claim 12 characterized by said elliptical portion carrying exteriorly an elliptical male thread merged with said circular male thread portion and which is forced to approach the circularity of the latter as said nut is threadably forced down upon said sleeve to cause the locking distortion of the elliptical sleeve portion.

15. A locking sleeve to be interposed between a cylindrical bolt shank having a standard helical male thread of certain outer diameter and a nut having a standard internally-threaded cylindrical bore of appreciably larger diameter, said locking sleeve comprising an elongated tubular body of resilient material having an internal circular standard helical female thread for free-running mating with the bolt shank thread, said body having a longitudinally-extending exterior section non-circular in transverse section and appreciably thicker in at least one radial plane than in others of said non-circular section, said non-circular section being threadably engageable by force in such nut for distortion toward circularity with attendant locking distortion of the internal sleeve female thread relative to such threaded bolt shank.

16. The locking sleeve as defined in claim 15 characterized by the provision of a non-circular male thread on said non-circular section distortably mateable with such internally-threaded nut bore toward concentricity with the latter.

17. The locking sleeve as defined in claim 15 characterized by the fabrication of said tubular sleeve body from elastic nonmetallic material with the exterior surface of said non-circular section being free of threads, said elastic material being distortable by such threaded nut bore to define mating threads on said unthreaded section surface with lateral distortion of the body of this section toward circularity to distort the internal sleeve female threads out of round to constitute the distortive locking action.

18. The locking sleeve as defined in claim 15 characterized by said sleeve body having one end of substantially circular cross section and readily receivable in such nut bore to facilitate starting of the nut onto the non-circular distortable section.

19. The locking sleeve as defined in claim 18 characterized by said non-circular section being slightly elliptical in cross section to be distorted toward circularity by forcible threading of the nut down thereon to distort the circular internal sleeve female thread toward ellipticity for locking to said bolt shank circular thread, said sleeve body having both ends similarly circular in cross section and readily nut-receivable to facilitate nut starting.

20. A locking sleeve to be interposed between a cylindrical bolt shank having a standard helical male thread of certain outer diameter and a nut having a standard internally-threaded cylindrical bore of appreciably larger diameter; said locking sleeve comprising an elongated, uninterrupted tubular body of resilient material having an internal circular standard helical female thread for free-running mating with the bolt shank thread; said body having similar, generally cylindrical end sections each being substantially circular in cross section and carrying at least a portion of a turn of a circular male helical thread for free-running mating with the female thread in the nut bore, and a medial section extending between said end sections, said medial section being slightly elliptical in cross section and appreciably thicker in a common radial plane on diametrically-opposite sides thereof than in intervening radial planes, said elliptical section carrying an external male helical thread as a continuation of the male thread portions on said end sections for mating with the female nut thread when said elliptical section is distorted toward circularity by forced threading of such nut thereon, the internal female sleeve thread in said elliptical section consequentially being distortable toward ellipticity for locking grip of such bolt shank male thread.

References Cited in the file of this patent

UNITED STATES PATENTS

| Number | Name | Date |
|---|---|---|
| 462,318 | Loehner | Nov. 3, 1891 |
| 1,063,397 | Shults | June 3, 1913 |
| 1,742,722 | Olsson et al. | Jan. 7, 1930 |
| 2,138,850 | Garnier | Dec. 6, 1938 |
| 2,286,982 | Todd | June 16, 1942 |
| 2,399,526 | Warren | Apr. 30, 1942 |
| 2,437,843 | Van Ness | Mar. 16, 1948 |
| 2,637,361 | Nagel | May 5, 1953 |